United States Patent [19]

Chilton

[11] 4,004,767
[45] Jan. 25, 1977

[54] PIPE HANGER

[75] Inventor: Dennis J. Chilton, Mississauga, Canada

[73] Assignee: Joseph Zentil, Toronto, Canada

[22] Filed: Oct. 28, 1975

[21] Appl. No.: 626,232

[52] U.S. Cl. ............................................. 248/58
[51] Int. Cl.² ......................................... F16L 3/00
[58] Field of Search .......... 248/58, 62, 74 A, 74 R, 248/315

[56] References Cited

UNITED STATES PATENTS

| 670,870 | 3/1901 | Drozeski | 248/62 X |
|---|---|---|---|
| 706,903 | 8/1902 | Crawford | 248/62 |
| 2,394,263 | 2/1946 | Reintjes | 248/58 |
| 2,671,625 | 3/1954 | Buckley | 248/58 |
| 2,846,169 | 8/1958 | Sullivan | 248/62 |

FOREIGN PATENTS OR APPLICATIONS

| 581,977 | 10/1924 | France | 248/74 R |
|---|---|---|---|
| 115,882 | 2/1946 | Sweden | 248/62 |
| 152,388 | 10/1951 | Sweden | 248/62 |

*Primary Examiner*—William H. Schultz
*Attorney, Agent, or Firm*—K. M. Hill

[57] ABSTRACT

The following specification discloses a pipe-supporting assembly comprising a hanger and a saddle. The hanger includes a pair of spaced and parallel oppositely and outwardly projecting tongues each having a pair of spaced co-planar slots opening upon the opposite side-edges of said tongues. The saddle is suspended from the tongues and has a pair of spaced substantially circular apertures therein and an open-ended substantially radial slot extending between each aperture and the ends of the saddle. The slots permit the saddle to engage the tongues and be supported rotatably thereby between the co-axial slots.

4 Claims, 3 Drawing Figures

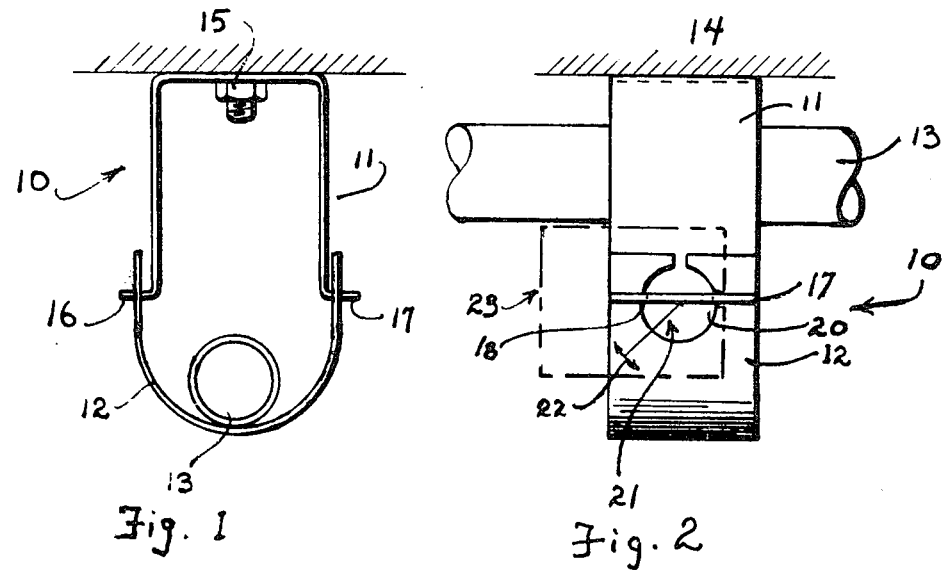
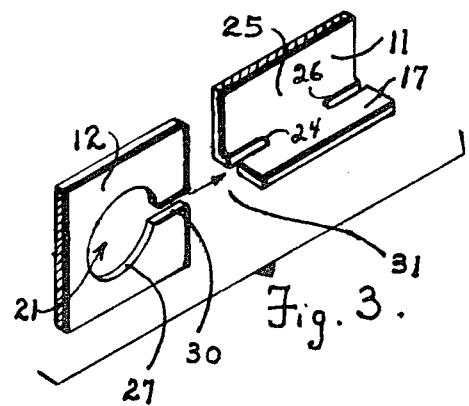

PIPE HANGER

The present invention relates to an assembly for supporting a pipe or other like elongated body. In particular the present invention relates to a hanger assembly that can be easily installed about a pipe without the requirement for bolts, nuts or other threadable fastening means to hold the assembly together.

PRIOR ART

It is known to suspend or hang a pipe from a bulkhead or ceiling by means of a support composed of a pair of clamping parts one of which is attached to the other when the pipe has been fitted in position but the known devices require Clevis type bolt and nut fastening means to hold the parts together. When the parts are made of cerrosive materials it is known that the device can be difficult to dis-assemble when the hanger and pipe assembly is in a cerrosive atmosphere. It is known further that to provide a pipe with uniform support, the lower clamp must be aligned below the pipe to give adequate support without causing strain.

It is the object of the invention herein therefore to provide a clamping assembly for a pipe that requires no fastening means to hold the clamp together and which is therefore easy to both assemble and dis-assemble and wherein the component parts interfit to align with and support a suspended pipe with ease.

SUMMARY OF THE INVENTION

The support assembly provided herein comprises a hanger and a mating saddle. The hanger is made from flat stock and includes a pair of spaced apart and outwardly projecting tongues. Each tongue has a pair of spaced co-planar slots opening upon the opposite side edges of the tongues. The saddle is a curved U shaped member adapted to hold a pipe within the U. The saddle is suspended from the tongues of the hanger by a pair of slotted circular apertures. An open ended substantially radial slot extends between each aperture and the ends of each U of the saddle. The slots permit the saddle to engage the tongues and be supported rotatably by them, between the slots.

With the foregoing objects in view and such other or further use of the invention as may become apparent from consideration of this disclosure the present invention is herein exemplified in the following preferred embodiment where references are made to the following drawings in which:

FIG. 1 is an end view of a hanger supported from a ceiling and engaging a saddle which is holding a pipe at its lower side.

FIG. 2 is a side view of the assembly showing the end of a tongue resting on the edge of the aperture and showing, in dot-dashed line, the position of the saddle when being assembled with the hanger.

FIG. 3 is a perspective view of a tongue end and a saddle arm at the moment of engagement thereof to show the method of mating the slots to allow the web of the tongue to come within the aperture to rest therein when assembled. Like reference numerals in the several views refer to like parts.

PREFERRED EMBODIMENT

In FIG. 1 the pipe support of the invention is designated numeral 10. 11 is the hanger and 12 the saddle. The hanger 11 is shown bolted to a ceiling 14 by bolt and nut fastening device 15. A pipe 13 is shown supported at the bottom of the U of saddle member 12 in FIG. 1.

The hanger is turned outwardly into tongues 16 and 17. FIG. 2 shown tongue 17 engaging and resting on the saddle at points 18 and 20 which are points along the inside edge of the aperture 21 formed on each of the arm of saddle 12. In FIG. 2, the pipe 13 is shown in raised position within the hanger 11 where it is temperarily held while the saddle 12 is assembled to the hanger.

Arrow 22 indicates that the saddle is rotatable about the slotted tongue 17 and dashed line 23 shows the position of the saddle is rotated into relative to the hanger tongue for assembly or dis-assembly.

The unique configuration of the slots and aperture of the invention and the means of effecting mating thereof to result in the novel hanger and support herein is shown more clearly in FIG. 3 where 11 is the bottom position of one side of the hanger and 17 is one of the outwardly extending tongues slotted as at 24 and 26 to form a web 25 therebetween. One of the arms of the saddle is shown as 12 with an aperture 21 cut from it as shown to form a tongue bearing edge 27 therein and having a slot 30 provide an opening between the aperture and the end of the saddle.

The saddle is shown in FIG. 3, turned 90° to the assembled position in order to indicate the method of assembly the saddle arms and the hanger tongues. Arrow 31 indicates the direction of movement of the aperture slot 30 to mate with slot 24. The saddle is interfitted with the tongue in direction of the arrow 31 until the end of slot 24, namely the web 25 contacts the wall or edge 27 of the saddle 12 at which time the saddle is rotated 90° to have the hanger arms and saddle in line and the web of the tongue formly in gripping relation with the edge of the aperture of the saddle.

It will be appreciated that the tongues are interfitted with the apertures simultaneously to result in the assembled hanger although for simplicity FIG. 3 shows only a section of a tongue being mated with a section of saddle.

It will be apparent from the above description and drawings that the invention herein has provided a novel hanger and indeed a novel means of attaching two suspended members using few parts and having simplicity of assembly. It is contemplated that the device herein will have additional and further uses and that modifications could be made at the structure without devicating from the inventive concept as defined in the following claims.

I claim:

1. A pipe-supporting assembly comprising in combination a hanger and a saddle, said assembly being characterized in that said hanger includes a pair of spaced and parallel oppositely and outwardly projecting tongues each having a pair of spaced co-planar slots therein opening upon the opposite side-edges of said tongues, said saddle being suspended from said tongues and having a pair of spaced substantially circular apertures therein and an open-ended substantially radial slot extending between each aperture and the ends of said saddle, said slots permitting said saddle to engage said tongues and be supported rotatably thereby between said co-axial slots.

2. The invention according to claim 1 in which said hanger is of flat-stock and includes a pair of flat spaced and parallel downwardly depending legs, a connecting piece spanning said legs at their upper ends, said tongues also being formed of said flat-stock, integral with said arms, and positioned at the lower distal ends thereof.

3. The invention according to claim 1 in which said saddle is of flat-stock and includes a pipe cradling portion, a pair of parallel and spaced upwardly extending arms on either side of said cradling portion, the spacing of said arms being such that they mate with said co-planar slots upon being introduced thereto from a side-edge of said assembly.

4. The invention according to claim 1 in which said hanger is of flat-stock and includes a pair of flat spaced and parallel downwardly depending legs, a connecting piece spanning said legs at their upper ends, said tongues also being formed of said flat-stock, integral with said arms, and positioned at the lower distal ends thereof, said saddle also being formed of flat-stock and including a pipe cradling portion, a pair of parallel and spaced upwardly extending arms on either side of said cradling portion, the spacing of said arms being such that they mate with said co-planar slots upon being introduced thereto from a side-edge of said assembly.

* * * * *